United States Patent [19]

Cole

[11] 4,398,805

[45] Aug. 16, 1983

[54] TRANSFLECTIVE LIQUID CRYSTAL DISPLAY

[75] Inventor: Herbert S. Cole, Scotia, N.Y.

[73] Assignee: General Electric Company, Schenectady, N.Y.

[21] Appl. No.: 280,582

[22] Filed: Jul. 6, 1981

[51] Int. Cl.³ .............................................. G02F 1/13
[52] U.S. Cl. ................... 350/345; 350/346; 350/349; 350/347 R
[58] Field of Search ............ 350/331 R, 345, 346, 350/349, 347 R

[56] References Cited

U.S. PATENT DOCUMENTS

| | | | |
|---|---|---|---|
| 3,833,287 | 9/1974 | Taylor et al. | 350/349 |
| 3,900,248 | 8/1975 | Nagasaki | 350/349 X |
| 4,025,161 | 5/1977 | La Roche | 350/331 R X |
| 4,093,356 | 6/1978 | Bigelow | 350/338 |
| 4,097,130 | 6/1978 | Cole, Jr. | 350/349 X |
| 4,126,383 | 11/1978 | Doriguzzi et al. | 350/345 X |
| 4,272,162 | 6/1981 | Togashi et al. | 350/349 |

FOREIGN PATENT DOCUMENTS 2033602A 5/1980 United Kingdom ................ 350/349

OTHER PUBLICATIONS

Cole, Jr., H. et al., "A New Display Configuration for Dichroic Liquid Crystals," *Society for Information Displays 1977 Digest*, (Apr. 19-21, 1977), pp. 96-97.
"New Absorptive Mode Reflective Liquid-Crystal Display Device," D. L. White and G. N. Taylor, Journal of Applied Physics, vol. 45, No. 11, Nov. 1974, pp. 4718-4723.

*Primary Examiner*—John K. Corbin
*Assistant Examiner*—Richard F. Gallivan
*Attorney, Agent, or Firm*—Geoffrey H. Krauss; James C. Davis, Jr.; Marvin Snyder

[57] ABSTRACT

A transflective liquid crystal display is viewable by either reflected or transmitted light. The display utilizes at least one display cell of the guest dichroic dye-host liquid crystal material type, wherein the molecules are substantially parallel to the cell walls and have a helical twist in the unactivated state and are oriented substantially perpendicular to the cell walls in the activated state. A partially-reflective, partially-transmissive transflector element, which is non-depolarizing, is placed adjacent to the rear of the display cell and is followed by a light-retarding element, having its retardation axis placed at an angle, typically 45° to the polarization axis of a subsequent linear-polarizing element. A light source, for use in the transmissive mode, is placed beyond the linear-polarizing element.

9 Claims, 2 Drawing Figures

TRANSFLECTIVE LIQUID CRYSTAL DISPLAY

BACKGROUND OF THE INVENTION

The present invention concerns liquid crystal displays and, more particularly, a novel transflective liquid crystal display providing bright viewable areas, in the activated condition, responsive either to reflected or transmitted light.

It is well-known to utilize a liquid crystal display to provide a low-power-consumption display which will not wash out when viewed in direct daylight. Displays of high brightness and acceptable contrast ratio may be provided by utilizing aa cholesteric host liquid crystal material with guest dichroic dye, as described by White and Taylor, in the Journal of Applied Physics, Vol. 45, page 4718 (1974). This form of display has acceptable viewability at moderate-to-high ambient light levels; in a low ambient light level situation, an external light source is typically required for the display to be viewable. Two external illumination methods are known: wedge illumination and back illumination. In the first technique, a light source is positioned in front, and at one edge, of the display cell, with light rays being directed by a wedge-shaped plate of glass or plastic, positioned in front of the display, toward the display cell. Light rays generally fall upon the display at a grazing angle, of approximately 15 to 20 degrees. At this incidence angle, a component of light is absorbed by molecules in the activated state, thereby degrading contrast. Further, the wedge illumination technique is relatively costly and cumbersome. Back illumination has hitherto been even less successful as, by reflection, light passes through the display twice and only once by transmission, if the display is designed to have sufficient brightness. Hitherto, no practical scheme has been available to view a guest-host liquid crystal display cell, such as a cholesteric display cell, by either transmission or reflection with sufficient contrast ratio and brightness in both the transmissive and reflective modes. Accordingly, it is highly desirable to provide a display which is transflective, i.e. viewable by both transmission and reflection with sufficient contrast ratio and brightness to provide acceptable viewing characteristics.

BRIEF SUMMARY OF THE INVENTION

In accordance with the invention, a liquid crystal display utilizes a cholesteric dichroic liquid crystal display cell having a front surface receiving ambient light, if present, and having sequentially arranged behind a cell rear surface: a partially-transmissive, diffuse reflector element of a non-depolarizing type, a quarter-wave retarder element, a linear-polarizing element, and means for selectively providing light for transmission through the polarizer, retarder, reflector and cell. The front cell surface appears in a bright condition when the cell is activated and in a dark condition when said cell is inactive, so that the display cell is thus capable of being viewed by reflection, when sufficient ambient light is present, and is capable of being viewed by transmission, in environments incapable of supplying sufficient ambient light for normal cell viewing.

Accordingly, it is an object of the present invention to provide a novel liquid crystal display capable of operation by reflection or transmission of light.

This and other objects of the present invention will become apparent upon consideration of the following detailed description, when read in conjunction with the drawings.

DETAILED DESCRIPTION OF THE INVENTION

Figure 1A:
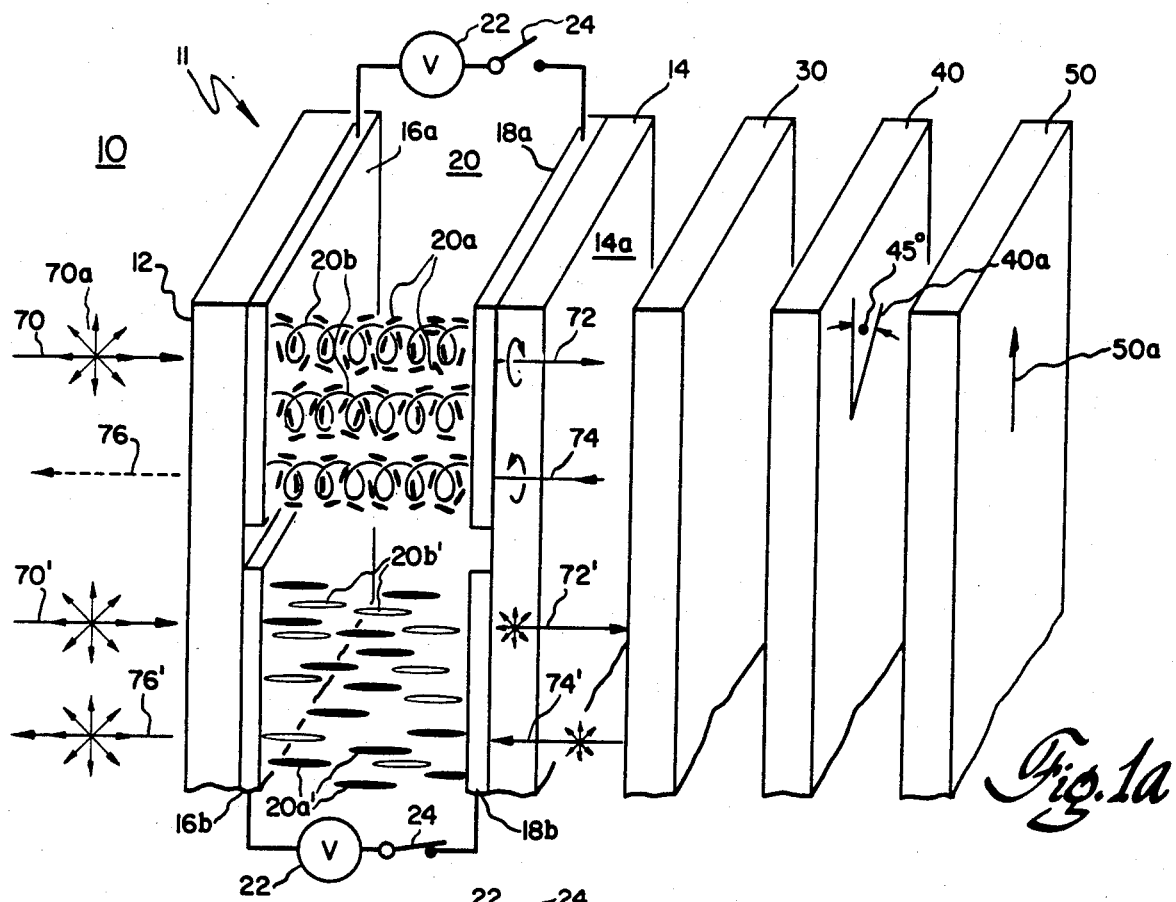
FIGS. 1a and 1b are partial perspective views of a display, in accordance with the principles of the present invention, respectively in the reflected and transmitted modes of operation.

Referring initially to FIG. 1a, a transflective liquid crystal display 10, in accordance with the invention, includes a liquid crystal display cell 11 having a front substrate 12 and rear substrate 14 of a substantially transparent material, such as glass and the like. At least one substantially transparent and conductive front electrode 16, such as upper front electrode 16a and lower front electrode 16b, are fabricated upon the interior surface of front substrate 12, while at least one substantially transparent and conductive rear electrodes 18, such as upper rear electrode 18a and lower rear electrode 18b, are fabricated upon the interior surface of rear substrate 14. As is known in the art, electrodes 16 and 18 may be fabricated of indium oxide, tin oxide, indium tin oxide and the like. Contained (by sealing means which are not shown) between the electrode-bearing interior facing surfaces of front and rear substrates 12 and 14 is a layer 20 of liquid crystal material. Layer 20 is advantageously of a dichroic liquid crystal material, in which dichroic dye molecules 20a are a guest in a liquid crystal host material 20b. Illustratively, the liquid crystal material is of the cholesteric type, whereby the liquid crystal molecules 20b assume a helical orientation with the molecules substantially parallel and twisted with respect to the cell walls, when the cell is in the inactive state (wherein an electric field does not exist between front rear electrodes 16 and 18), i.e. when a voltage source 22 is not effectively connected, through switching means 24, between front and rear electrodes 16 and 18. With switching means 24 open, the liquid crystal material molecules 20b assume their normal orientation, illustratively the helical cholesteric oreientation, whereby guest dichroic dye molecules 20a also have a helical orientation. The unexcited condition is shown by those liquid crystal host molecules and guest dichroic dye molecules in the upper portion of the illustrative cell, between upper electrodes 16a and 18a.

Upon closure of switch means 24, an electric field is formed between the front and rear electrodes and the liquid crystal molecules are caused to assume the homeotropic orientation, with their director (the long axes thereof) substantially perpendicular to the plane of front and rear electrodes 16 and 18. The activated condition is shown in the lower part of cell 11, between front and rear electrodes 16b and 18b, respectively. Having assumed the homeotropic orientation, liquid crystal molecules 20b' cause the guest dichroic dye molecules 20a' to also assume the homeotropic orientation, with the elongated director axes thereof also substantially perpendicular to the electrode planes.

Arranged sequentially behind rear substrate exterior surface 14a is a diffuse transflector 30, preferably of a metallic material, which has a high degree of, but less than complete, reflectance and which has a low degree of transmission. Typically, transmission of about 5% to about 10% of light through transflector means 30 is desirable. A quarter-wave retarder means 40 is sandwiched between transflector means 30 and a linear polarizing means 50. The quarter-wave retarder means optical axis 40a is set at about a 45° angle with respect to the linear polarization axis 50a of linear polarizing means 50. It will be seen that the quarter-wave retarder means 40 can be positioned at about a 45° angle with respect to linear polarizer means 50 in either of two conditions, to give either right-handed or left-handed circularly-polarized light. The retarder means handedness is opposite to the handedness of the helical twist of the chloresteric liquid crystal host molecules, as viewed in the direction of light ray travel through the display. A transmission light source 60 is placed behind linear polarizing means 50, and is the element of display 10 furthest from cell 11 (see FIG. 1b).

In operation, in the reflective mode of FIG. 1a, ambient light 70 enters the front substrate 12 of the cell 11 of display 10. Ambient light 70 is of random polarization, as shown by the unpolarized light vectors 70a. In the unactivated state, cell 11 has the dichroic dye molecules 20a cooperatively aligned with host cholesteric liquid crystal molecules 20b in a helical twisted structure and substantially absorbs incident light 70. Preferentially, the fraction of light 72 exiting from cell rear surface 14a is somewhat elliptically or circularly polarized. Attenuated light 72 is substantially reflected and diffused by subsequentially encountered diffuse transflector means 30. The reflected light ray 74, now of opposite handedness as light ray 72, re-enters the cell and is again substantially attentuated by the helically-aligned dichroic dye molecules. Advantageously, the amount of absorption encountered by entering light ray 70, during the forward and reverse passages through cell 11, is sufficient to substantially completely absorb the light, whereby exiting light ray 76 is of substantially zero amplitude. A viewer therefore views the inactivated display portion as being in the dark condition.

When the cell is in the active condition in the reflective case (bottom portion of FIG. 1a), the incident light ray 70' encounters the dichroic dye molecules 20' aligned in the direction of ray travel, whereby minimum attenuation of beam 70' occurs. Therefore, the randomly-polarized exiting beam 72' is of substantially greater amplitude than beam 72 in the cell-unactivated case. Beam 72' in reflected and diffused by transflector element 30 and returns as a beam 74' of substantial amplitude. Beam 74 re-enters cell 11, passes therethrough without substantial attenuation and emerges as a bright beam 76', viewable by a viewer stationed in front of cell front substrate 12. Therefore, the activated display cell 11 appears bright against a dark background (of unactivated portions) and is seen in high contrast by the viewer. Because transflector 30 also acts as a diffuser, the bright portion is viewable over a large viewing angle, with respect to the normal to the front cell substrate surface.

In the transmissive mode (FIG. 1b), ambient light does not enter the front substrate 12 of the cell. The display is lit by light emanating from rear source 60. In the unactivated-cell condition (upper portion of cell 11), the light beam 80 from source 60 is initially randomly polarized, as shown by the light electric field vectors 80a. Beam 80 passes through linear polarizing means 50, whereby the exiting beam 82 is substantially linearly polarized with electric field vectors 82a only in the direction parallel to the polarization vector 50a of means 50. In the illustrated embodiment, polarization vextors 82a are vertical. The vertically-polarized beam 82 passes through quarter-wave retarder means and emerges as a beam 84 with a circular polarization vector 84a. The circularly-polarized beam 84 passes through the partially-transmissive transflector means 30 and emerges as a somewhat attenuated beam 86, still having circular polarization vector 86a. The circularly-polarized light beam 86 enters cell 11 and encounters the helically oriented dichroic dye molecules 20a. The circularly-polarized light beam 86 is of the opposite handedness from the helical twist sense of the dichroic dye-cholesteric host liquid crystal mixture. Dye molecules 20a substantially absorb beam 86 in the unactivated cell. Accordingly, the exiting beam 88 is of substantially zero light amplitude, whereby the upper portion of cell 11, in transmissive operation, appears dark to an observer. It will be seen that the attenuation through transflector means 30, in the transmissive mode, should be about equal to the sum of the attenuation due to one passage through the cell plus loss at reflectance by the transflector means in the reflective mode.

Figure 1B:
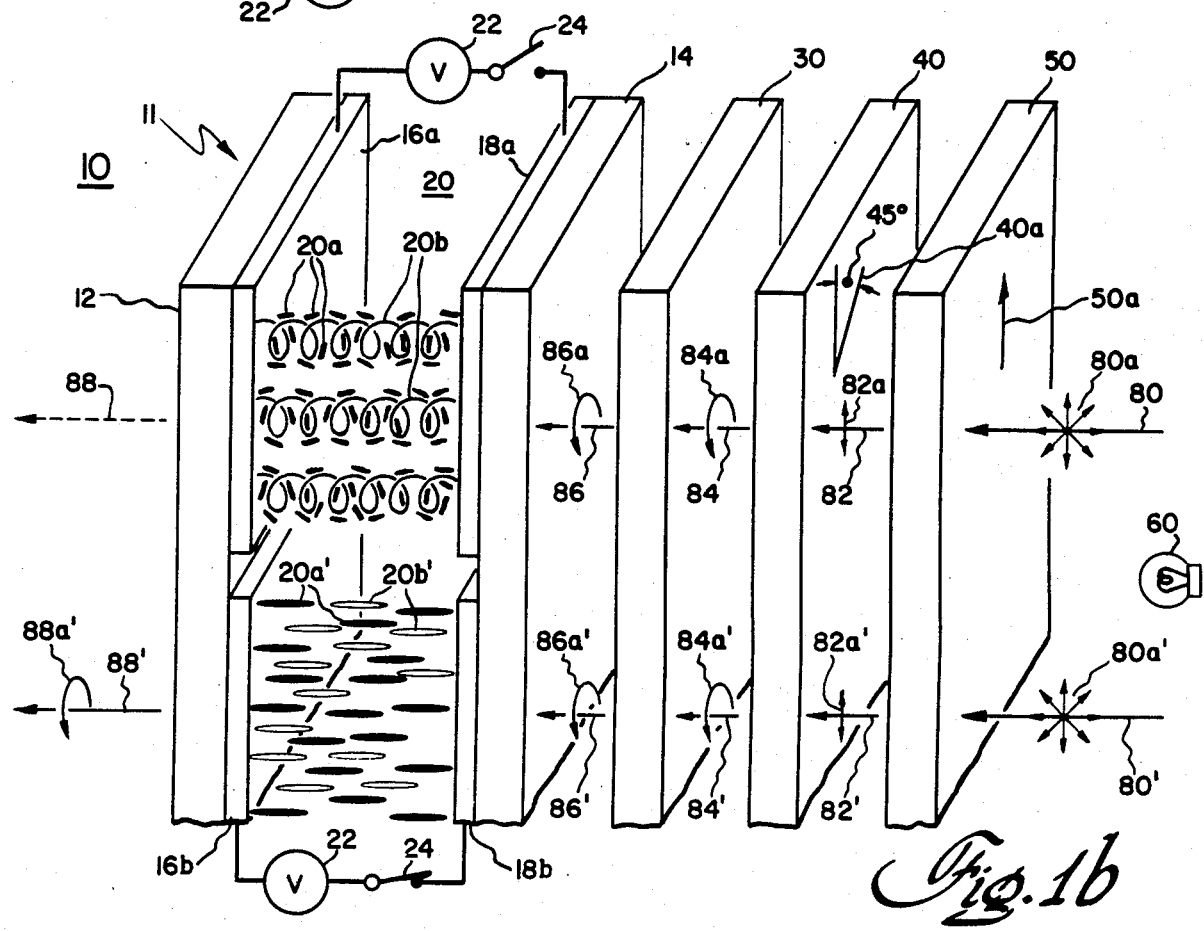

When switch 24 is closed, and the cell activated, as in the lower portion of cell 11 of FIG. 1b, the entering randomly-polarized ray 80' is still linearly polarized by passage through linear-polarizing means 50. The emerging linearly-polarized ray 82' passes through the quarter-wave retarder means 40 and emerges as circularly-polarized beam 84'. After passage through the partially transmissive reflector means 30, the somewhat attenuated, circular-polarized beam 86' enters cell 11. As the cell is activated, the host liquid crystal material and the guest dichroic dye molecules are all substantially aligned in the homeotropic orientation, substantially perpendicular to the cell walls. The circularly-polarized-ray 86' therefore passes through the liquid crystal cell with relatively little attenuation, emerging as a ray 88', having circular polarization and a non-zero amplitude. Ray 88' is visible to an observer.

It will be seen that in the cell-unactivated state, each cell portion of display 10 appears dark to an observer in either the reflective or transmissive mode, while each activated cell portion of the display appears, in either mode, as a bright area to an observer.

The direction of twist of the circularly-polarized light and of the cholesteric liquid crystal composition are of importance only in the transmissive case, wherein the circular polarizations are so arranged as to be opposite one another in a direction of light transmission from the rear of the cell through to the observable front surface. Thus, in the illustrated example, light ray 86 has a left-handed (counterclockwise) polarization, with respect to its direction of travel, while liquid crystal molecules 20b are established, as by means of a chiral additive which imparts a twist of the dichroic cholesteric liquid crystal layer, to have circular-polarity of the "opposite handedness," i.e. right-handed or clockwise, twist in the direction from rear substrate 14 forward toward front substrate 12. This condition results in light propogating across the long axis of the dye molecules and hence assures substantial light absorption therein. Accordingly, incident unpolarized light in both the reflective and transmissive modes are absorbed, while the intensity of the circularly polarized light in the homeotropic-aligned dichroic liquid crystal material of the transmissive, activated state is substantially uneffective.

In one embodiment, cell 11 had a substrate-to-substrate spacing on the order of 12 microns, with homeotropic boundary conditions established at the electrode surfaces. A black dichroic cholesteric liquid crystal mixture 20 was introduced into the cell. The liquid crystal mixture had a pitch of about 3.3 microns. Transflector means 30 was diffuse metallic silver coating, having about 5% transmission, and was fabricated directly upon the exterior rear substrate surface 14a. Behind this "transflector," the quarter-wave retarder 40 and linear polarizer 50 were sequentially placed. For this cell, is in the reflective mode, a contrast ratio of 12.1 and reflectance of 49% were achieved with a light source at an angle of 20° with respect to the normal of the cell front surface, while a contrast ratio of 11.8 and a reflectance of 37% was achieved with a light source of a 30° angle with respect to the cell front substrate surface normal. In the transmissive mode, a contrast ratio of 6.8 was achieved (falling to a contrast ratio of approximately 3.1 when the quarter-wave retarder means 40 was removed). It will be seen that the brightness of the display operating in the transmissive mode, is established by the intensity of light source 60. It will also be seen that the contrast ratio is highly improved when quarter-wave retarder means 40 is present, in the transmissive mode.

A similar 12-micron display cell was fabricated and filed with another black dichroic liquid crystal material, wherein the rear substrate and electrodes were coated with a polyimide surfactant and rubbed to provide parallel surface boundary conditions. The front surface was made homeotropic by use of a suitable surfactant and the same transflective structure was placed behind the cell. The particular liquid crystal material had a pitch of about 8 microns. In the reflective mode, with the light source at an angle of 20° with respect to the cell front surface normal, a contrast ratio of 10.3 and a reflectance of 49% were measured. In the transmissive mode, a contrast ratio of 5.9 was measured. The quarter-wave retarder was removed and the polarizing means 50 was so aligned as to be substantially perpendicular to the light-polarizing alignment of the parallel boundary conditions at the cell rear surface. In this configuration a contrast ratio of 3.1 was achieved, again demonstrating that circular polarization of the light in the transmissive mode provides substantially greater contrast ratio than the mere use of orthogonal polarizers.

I have found that for liquid crystal compositions having relatively long pitch, on the order of 4 to 8 microns, there appears to be some optimum degree of phase retardation, provided by retarder means 40, which provides elliptically polarized light and results in an optimum display contrast. However, I have found that circularly polarized light of the appropriate handedness will improve the contrast ratio, with respect to linearly or unpolarized light. For example, when an optically-active cyanobiphenyl compound, such as the commercially available CB-15 additive, is used, circular polarization in a first direction is achieved. If other additives, such as cholesteral nonanoate, are used, the pitch of the liquid crystal composition twists in an opposite direction and requires that retarder means 40b be adjusted to give circularly polarized light of the opposite handedness to improve contrast. Accordingly, cholesteric dichroic liquid crystal material phase change display cells of either twist sense can be used in display 10, by choosing the appropriate retarder means 40 and/or polarizer means 50.

While a specific embodiment of the present invention has been described in detail herein, many modifications and variation will now become apparent to those skilled in the art. For example, negative anisotropy host cholesterics with long pitch may be used to give a display with dark characters on a light background; the use of colored filters, isotropic dyes, or dyes which have their transition moment perpendicular to the long axis, and similar modification is also contemplated as part of the present invention. It is my intent, therefore, to be limited only by the scope of the appending claims and not by these specific details presented by way of explanation herein.

What is claimed is:

1. A display viewable by reflected or transmitted light, comprising:
    a liquid crystal display cell having relatively low attenuation of light passing therethrough with any polarization in the activated condition and having substantial attenuation in an unactivated condition, of at least randomly and circularly polarized light of a first handedness sense passing therethrough, said cell having a first surface viewable by an observer and a second surface opposite said first surface;
    transflector means adjacent to said cell second surface for reflecting back to said cell a relatively large portion of light impingent thereon from said cell and also for transmitting a relatively lesser portion of light arriving from a direction opposite from the direction of said cell;
    means, placed beyond said transflector means with respect to said display cell, for linearly polarizing light in a first direction; and
    means, positioned between said transflector and polarizing means, for imparting circular polarization to linearly polarized light arriving from said polarizing means and traveling toward said transflector means; said circularly-polarizing means imparting a twist handedness sense to said light opposite to the first handedness sense in said cell in said unactivated state;
    said cell appearing dark in said unactivated condition when light is transmitted or reflected by said display and appearing in a bright condition when light is transmitted or reflected through the display in the activated state.

2. The display of claim 1, further comprising a light source positioned beyond said polarizing means, with respect to said display cell.

3. The display of claim 1, wherein said circular-polarization means is a quarter-wave retarder.

4. The display of claim 3, wherein the quarter-wave retarder has optical axis aligned at an angle of 45° with the polarization axis of said polarizing means.

5. The display of claim 1, wherein said transflector is a diffuse metallic member.

6. The display of claim 1 or 5, where said transflector means transmitted about 5% of impingent light therethrough.

7. The display of claim 1, wherein said cell includes a guest dichroic dye dissolved in a host liquid crystal material.

8. The display of claim 7, wherein said liquid crystal material is a cholesteric material.

9. The display of claim 1, wherein said transflector means is non-depolarizing.

* * * * *